United States Patent [19]

de Massey et al.

[11] 4,168,345

[45] Sep. 18, 1979

[54] SIZING FOR GLASS FIBERS AND OTHER SIMILARLY-COATED FIBERS

[75] Inventors: Bernard de Massey, Chambery; Gilbert Bocquet, Challes les Eaux; Jacques Molinier, La Motte Servolex, all of France

[73] Assignee: Saint-Gobain Industries, Neuilly-sur-Seine, France

[21] Appl. No.: 800,311

[22] Filed: May 25, 1977

[30] Foreign Application Priority Data

May 26, 1976 [FR] France ................................ 76 15887

[51] Int. Cl.² ........................ B32B 17/10; C08L 3/02; C08L 3/04
[52] U.S. Cl. ............................ 428/441; 260/17.4 ST; 428/392; 428/442; 428/532
[58] Field of Search ................ 260/17.4 ST; 428/378, 428/392, 441

[56] References Cited

U.S. PATENT DOCUMENTS

| | | | |
|---|---|---|---|
| 3,108,441 | 10/1963 | Watson | 106/900 |
| 3,227,192 | 1/1966 | Griffiths | 260/17.4 ST |
| 3,793,065 | 2/1974 | Morrison et al. | 260/17.4 ST |
| 3,946,132 | 3/1976 | Hedden | 260/17.4 ST |
| 4,009,317 | 2/1977 | Chase et al. | 428/392 |
| 4,049,597 | 9/1977 | Motsinger | 260/18 EP |

OTHER PUBLICATIONS

Chem. Absts., vol. 69:61302w, Rammel.
Chem. Absts., vol. 75:67031c, Ingatius.
Chem. Absts., vol. 83:44659q, Mukai.
Chem. Absts., vol. 83:44660h, Graham.
Chem. Absts., vol. 83:194901b, Hedden.
Chem. Absts., vol. 85:7208m, Miyakoshi.

*Primary Examiner*—Edward M. Woodberry
*Attorney, Agent, or Firm*—John T. Synnestvedt; William P. Cole

[57] ABSTRACT

Sizing compositions for coating glass fibers as well as the coated fibers in which the compositions are constituted essentially of two film forming agents and of two lubricants. One film forming agent is a modified starch in which almost the entire mass of starch granules is burst. The second is an acrylic polymer, preferably a water-soluble one. One lubricant is non-ionic and preferably a mineral oil. The second is a polyethylene wax in the form of an aqueous emulsion containing a cationic emulsifier.

21 Claims, No Drawings

SIZING FOR GLASS FIBERS AND OTHER SIMILARLY-COATED FIBERS

The present invention relates to sizing compositions for coating glass fibers, as well as similarly-coated fibers, to protect them against abrasion during standard textile operations.

Glass fibers, as is known, are made by the attenuation of small molten threads flowing from the holes of a threading-die or bushing. These glass threads are thinned out to form continuous filaments in an attenuating process, by winding the filaments, after they have been collected into a thread, onto a spool turning at a very high speed. Before being collected into a thread, the filaments are coated with a sizing by passing through a continuously-fed sizing device.

The sizing is applied in order to retard abrasion and the breaking of individual threads as the threads pass at great speeds through the guiding devices during such textile operations as twisting, cabling, warping and weaving. As a result, it is necessary that this sizing perform the double functions of protecting and lubricating, while at the same time achieving integrity of the fibers, that is, a sufficient cohesion of the fibers to each other.

It is known to use sizings of aqueous solutions or dispersions containing essentially a film-forming starch base together with a non-ionic lubricant, which is generally a vegetable oil, an emulsifier and a cationic lubricant.

The starch used in these sizings differs for each application according to the desired properties, and can be either a starch with a high percentage of amylose (French Pat. No. 1 316 288), possibly hydroxethylized (U.S. Pat. No. 3,265,516), or a starch mixture with a high or low percentage of amylose (French Pat. No. 1 371 192), or again, a mixture of natural and cationized starch with a high percentage of amylose (French Pat. No. 2 067 249; U.S. Pat. No. 3,615,311). It is also possible to use fractions of starch (U.S. Pat. No. 3,462,254).

It has been known in the art to use sizings constituted principally of benzyl starch-ether, in combination with a vegetable or mineral wax, for example, a paraffin wax, an emulsifier and a cationic lubricant (French Pat. No. 1 604 236; British Pat. No. 1 228 850). The possible addition of unmodified starch, is also proposed, but the sizing will then contain a certain quantity of swollen, but unburst, grains of starch (French Pat. No. 2 080 891; U.S. Pat. No. 3,664,855).

It is also known to add to these sizings of a benzyl-starch ether base, an emulsion of particles formed of a methyl methacrylate polymer and coated with an envelope of other polymers, such as ethyl acrylate or 2-ethylhexyl acrylate (French Pat. No. 2 250 717).

However, while all these sizings of the past techniques have compositions which, for each application, present a particular advantage, they do not combine all of the desired characteristics. In particular, these sizings cannot resolve at one time, all the difficulties resulting from the manufacture of glass fiber threads designed for weaving.

The first object of the invention is to avoid, as much as possible, the phenomenon of sizing migration. This means the displacement of a part of the sizing components from the inner part to the outer part of the threads wound on the bobbins, or cakes, formed during fiberization by winding. This migration occurs principally during the period required to dry the cakes before the twisting operation of the threads, a period during the course of which the elimination of the water sweeps the size components outwardly. It results that the percentage of dry size on the external threads of the cake is higher than that found on the threads in the center of the cake. The threads that are overcharged with dry size are not usable in textile operations.

It is thus necessary to obtain threads uniformly and consistently sized throughout their whole length:

To avoid dry sizing-waste or powder on the guide mechanism during textile finishing operations, To equalize the torsion of the threads during twisting and to maintain this torsion, To avoid streaking of material woven from the threads, which material must be de-sized for certain applications (for example, the reinforcement of synthetic resins). These streaks appear on de-sized woven material as a result of bad local de-sizing due to over-sized threads.

Other difficulties appear during the course of textile operations, difficulties relating to a lack of thread integrity, which leads to the breakage of the threads, and the appearance of fuzz. On the other hand, too much thread integrity results in stiffness. The composition of the sizing should be such that the strands constituting the threads are sufficiently adhered to each other, without restricting all mobility between them. A lack of mobility results in uneven tension among the threads, which can also provoke breakage and the appearance of fuzz, which then clog the textile finishing machines.

Among the disadvantages of the several sizings of the prior art, it is important to note the deposit of powder on the guide-parts or in the devices used for textile operations. This can lead to a breakdown of cohesion of the film-forming components of the sizing, either by a too large amount of dry size deposited on the thread, or by an uneven distribution of this size.

Another disadvantage of some known sizings is their resistance to de-sizing, which is generally accomplished thermally. This difficulty is due to the presence of components in the size that are difficult to completely remove by pyrolysis at fixed temperatures in the absence of oxygen. This results in a residue that changes the dielectric properties of the woven material and leads to streaking or a slight local discoloration.

These diverse difficulties and inconveniences are avoided by using the sizings of the present invention, which tend toward a very reduced migration of the constituents of the sizing, improved thread integrity, absence of powder on finishing machines, and fast and complete desizing under the usual heat-de-sizing conditions. The aqueous starch base size compositions of the invention have the great advantage that, while depositing a much smaller quantity of dry starch base size on the threads, than is normally used, they nevertheless assure excellent protection of the threads during textile operations. Moreover, the improved properties of the sized thread permit the warping operation to proceed at substantially elevated speeds.

The new sizings, which contribute these improved thread characteristics, are constituted essentially of:

Two film-forming agents, of which one is a modified starch of low viscosity and the second an acrylic polymer, preferably a water-soluble one.

Two lubricants, one being a non-ionic lubricant, preferably a mineral oil, and the second being a polyethylene wax in the form of an aqueous emulsion containing a cationic emulsifier.

The composition of the sizings of the invention, expressed by weight parts of each component for 100 parts of size, is the following:

Modified starch
  0.5 to 10% and preferably 3 to 5% (in powder form containing about 10 to 15% moisture),
Acrylic polymer
  0.1 to 5% and preferably 0.3 to 1.5% (on a dry basis),
Non-ionic lubricant
  Mineral oil made emulsifiable in water by an emulsifier or surfactant: 1–5% and preferably 1.5 to 2.5%,
Polyethylene wax
  0.2 to 2% and preferably 0.3 to 1%,
Cationic emulsifier for the polyethylene wax
  0.03 to 0.6% and preferably 0.07 to 0.25%,
Water
  A sufficient quantity to bring the total composition to 100 parts.

The relative proportion of emulsifier or surfactant with respect to mineral oil is 15 to 30% by weight.

The combination of the four principal components (starch, mineral oil, polyethylene wax in the form of a cationic emulsion and acrylic polymer) makes it possible to obtain threads possessing all of the previously-enumerated advantageous characteristics, and embodying dry size in amount between 0.40 and 1.2% by weight, preferably 0.60 to 0.80%; these small amounts permit, under good conditions, all the textile finishing work to be effected, and rapid and complete de-sizing at the normal temperature to be achieved. De-sizing can also be effected at lower than normal temperatures.

On the other hand, this composition has remarkable stability. It can be applied on glass fibers at a temperature between ambient and 65° C., preferably between 30° and 35° C., without modification of its properties and without the risk of separation of the size components.

The presence in the sizing of an acrylic polymer, a polyethylene wax emulsified by a cationic agent, and a mineral oil, in the aforementioned proportions, makes possible the utilization in the composition of starches modified in very different ways, without affecting or losing any of the cited advantageous characteristics. The starches which are usable are starches possessing indifferently a high percentage or a low percentage of amylose, for example, corn starch, potato starch or hybrid corn starch, which have undergone one of the known modification treatments, such as (1) etherification by reaction with an alkylene oxide, such as, for example, ethylene oxides or propylene oxides, or (2) esterification, for example by an acid anhydride or by a phosphate or (3) a cationization reaction to attach nitrogenous groups to the starch, or (4) a liquefying treatment by the hydrolytic action of a strong acid, such as hydrochloric acid. In the first three cases, for starches with a low percentage of amylose, the number of groups substituted is between 0.01 and 0.30 and preferably between 0.02 and 0.12 per anhydrous glucose group of the starch.

These diverse treatments have the common characteristic of lowering the viscosity of natural starches.

The solutions of modified starch used in the compositions according to the invention, after cooking in conditions favorable to achieving the total bursting of the starch granules, have a low viscosity, that is, a viscosity on the order of 15 to 200 cPo and preferably 20 to 50 cPo at a concentration of 6% and a temperature of 20° C.

It is important that almost all of the starch granules be bursted, but it is possible to use starches which contain from about 5 to 10% of granules which are swollen but not bursted.

The second film-forming component introduced into the composition is an acrylic copolymer, preferably soluble in water, that is formed by at least an anionic monomer taken from group A consisting of acrylic, methacrylic, fumaric and itaconic acids at the rate of 1 to 15 parts by weight per 100 parts of copolymer and one or several non-ionic monomers taken from group B consisting of acrylamide, acrylonitrile, acrylates and alkyl methacrylates at the rate of 30 to 95 parts by weight.

The preferred alkyl acrylates and methacrylates are those possessing a linear or branched alkyl radical including up to eight carbon atoms, such as the methyl, ethyl and butyl acrylates and methacrylates.

In addition, these anionic acrylic copolymers can also contain up to 10 parts by weight of N-methylol acrylamide. This co-monomer facilitates autoreticulation of the polymers by heat.

Finally, non-acrylic monomers, such as butadiene, styrene, vinyl acetate or vinyl chloride, can also be added to the preceding elements to form anionic copolymers, in a quantity at most equal to 70 parts by weight for 100 parts of copolymer.

It is, on the other hand, advantageous to increase the water solubility of the anionic copolymers, to partially neutralize their acid groups by a base such as sodium hydroxide, ammonia or triethanolamine. The rate of neutralization is chosen in connection with the desired viscosity of the final solution.

The utilization of these anionic copolymers in the size compositions of starch base, polyethylene and mineral oil, represents the preferred embodiment of the invention. However, the non-ionic acrylic homopolymers or copolymers formed from monomers selected from previously-determined group B of non-ionic monomers are also utilizable in these sizings. Among this group, the copolymers formed from at least 20 parts by weight of acrylamide, and those that are water soluble are of particular interest.

Eventually, the N-methythol acrylamide, or at least one of the monomers, for example, butadiene, styrene, vinyl acetate or vinyl chloride, can also be added to the non-ionic monomer(s) in a quantity at most equal to 10 parts by weight of N-methythol acrylamide and at most equal to 70 parts by weight for each of the others.

The acrylic polymers thus defined are constituted of film-forming components that, in combination with the other components of the size, clearly improve the integrity of the sized threads. It is possible in varying the nature or the properties of each monomer or neutralizing agent, to modify the film-forming properties of the copolymer and to obtain films more or less hard or more or less adhesive; the modifications have a direct influence on thread integrity.

The non-ionic lubricant is a mineral oil, preferably of low viscosity, and is utilized in the form of an aqueous emulsion in the size. The oil has the advantage of facilitating sizing, compared to the vegetable oils often utilized, such as hydrogenized corn oil. The mineral oil is rendered emulsifiable in water by the addition of between 15 to 30% by weight, with respect to the oil, of an emulsifier, which emulsifier is preferably the product of a condensation of from six to ten molecules of ethylene oxide with a primary aliphatic long-carbon chain amine. Other non-ionic emulsifying agents well known in the art are also utilizable in the same proportions, notably those of the alkylphenolpolyoxy ethylene or fatty sorbitol polyoxyethylene ester acid, or fatty acid long-chained polyoxyethylene types.

The polyethylene wax is introduced into the size composition according to the invention at a point of elevated melting point, preferably between 100° and 130° C. It is put into emulsion in the water by means of a cationic emulsifying agent of the aliphatic amine type quaternized with a long carbonic chain of which the relative proportion by weight with respect to the polyethylene is 15 to 30%. Other cationic emulsifiers, such as fatty amines of long polyoxethylene chains are also usable, without departing from the framework of the invention.

The presence of this polyethylene wax emulsion assures good fiber equitension by permitting a certain relative mobility of the fibers. In addition, it enhances protection of the fibers against the abrasion produced by the scraping of the fibers against the guide mechanisms, avoiding, in this way, breaking of the fibers. Finally, the polyethylene gives the fibers a very white appearance.

The sizes according to the invention contain approximately between 3 to 10% and preferably 4.5 to 6.5% dry extract obtained after an evaporation at 82° C. for one hour, then steaming for 10 minutes at 105° C.

Other characteristics and advantages of the invention will appear from the following description; the particular examples of operation are not intended to limit the scope of the invention.

EXAMPLE 1

According to the preferred mode of operation, a size is prepared using the following components (quantities expressed in parts by weight for 100 parts of size):

|  | % by weight |
|---|---|
| corn starch with 26% amylose liquified by acid and etherified by propylene oxide (containing 0.035 ether groups per anhydro-glucose group) | 3.90 |
| acrylic copolymer of acrylonitrile, acrylamide and acrylic acid in these respective proportions: 40%, 55%, 5% | 0.36 |
| emulsifiable liquid vaseline containing 80% by weight of liquid vaseline viscosity 3° Engler at 20° C.) 20% by weight of emulsifier: product of condensation of stearinamine with eight ethylene oxide molecules. | 1.83 |
| aqueous cationic polyethylene emulsion with 25% active material containing 20% by weight of polyethylene, melting, point = 115° C. density = 0.93 (ASTM D 1505 norm) PM high, Brookfield viscosity at 140° C. = 200 cPo 5% by weight of cationic emulsifier: amine quaternized with long chain having from 12 to 16 carbon atoms containing essentially dimethyl lauryl ammonium.) | 1.73 |
| demineralized water | amount needed to bring mixture to 100 parts |

The starch suspension is prepared in a first tank by the introduction of the starch into ½ the total volume of the demineralized water at 40° C. The starch suspension is then thermally treated in a continuous steam-injection cooker at a temperature of 95° C. for 25 seconds. The starch granules are thus completely burst. The viscosity of the paste thus obtained is on the order of 10 cPo at 8% concentration and a temperature of 90° C. In a second tank, the acrylic copolymer, neutralized at a pH equal to 7 by an equimolecular mix of triethanolamine and sodium hydroxide, is added to about 1/10 of the total volume of demineralized water brought to 75° C. The mix is agitated just until a clear, transparent liquid is obtained, and then cooled by the addition of demineralized water to bring the temperature to 40° C.

The acrylic copolymer used in this example is totally soluble in water, it has a pH of 7, and at a 20% concentration, a viscosity of 45000 cPo at 22° C. is measured on the Brookfield viscosimeter, speed 10 mode 6. A 2% solution has a viscosity of 6.5 cPo at 22° C.

The starch size coming from the cooker is continuously introduced into the acrylic copolymer solution and the mixture is cooled to 40° C.

In a third tank an emulsion of the lubricants is formed, using 1/10 of the total volume of demineralized water and while successively adding, under moderate agitation, the mineral oil containing the emulsifier, then the cationic polyethylene emulsion. The emulsion of liquid paraffin has the advantage that it makes homogenization unnecessary, either for formation or after the addition of additional constituents. At the end of preparation, the mixture of the lubricants in emulsion has a pH of 7.4 and a temperature of 23° C., and it is introduced into the tank already containing the starch paste and the acrylic copolymer. The rest of the water is added, the pH is adjusted to 7.2 and the temperature regulated at 35° C. This temperature is maintained during the storing and the distribution of the size. This mix has a viscosity of 10 cPo at 35° C. and a dry extract of 5.5% by weight.

There follows the fiberization of the glass E, an operation during the course of which the size, which has been maintained at 35° C., is applied. The size devices are of the rubber roller type. The coated threads are collected into a fiber which is rolled in the usual manner to form cakes.

The amount of dry size deposited on the fiber 34Tex (1 Tex=1 g per 1,000 m of fiber) determined by known techniques of heat loss, is 0.75% by weight of thread.

The quantity of dry size on the parts of the fiber on the outside and at the center of the cake are measured to evaluate migration.

With the size of Example 1, the quantity of thread situated at the ends of the cake, and having a percentage of size greater than 0.80%, represents a length of 1,000 m, no matter what total fiber length makes up the cake. The rest of the thread has a very regular percentage of dry size with the limits: 0.75%±0.05%.

The amount of dry size deposited on the thread being small as compared to that deposited on the thread with standard sizes (see comparison with Example 2), the later operation of de-sizing is facilitated and can be effected at lower temperatures or during a shorter time period.

EXAMPLE 2

This example relates to a known, standard size containing the normally-used materials.

The later textile operations such as twisting, cabling, and weaving, and then de-sizing are effected with threads coated with this standard size and with threads coated with the size according to Example 1 for a comparison of the results.

A standard size is prepared having the following composition in weight percentage (with respect to 100 parts of size):

| | % by weight |
|---|---|
| hybrid corn starch at 60% amylose | 3.81 |
| cationic derivative of corn starch at high rate of amylose | 0.42 |
| vegetable oil: hydrogenized corn oil | 1.27 |
| emulsifier: polyoxyethylene sorbitan monooleate | 0.13 |
| cationic lubricant: product of the condensation of tetraethylene pentamine with stearic acid solubilized by acetic acid | 0.21 |
| polyethylene glycol PM = 300 | 0.13 |
| softening agent: nonylphenol polyoxyethylenated with 9 moles of ethylene oxide | 0.02 |
| tributyl tin oxide (antifongic) | 0.01 |
| water | complement |

The starches are dispersed in water and the mixture is cooked in a continuously-fed vapor-injection cooker under about 1 bar pressure and in which the temperature is regulated at about 100° C. In these conditions, there exists a large proportion of incompletely burst starch granules. The polyethylene glycol and the cationic lubricant are then incorporated into the cooked mixture after it has been cooled. An emulsion of vegetable oil, the softening agent and the emulsifier heated to about 70° C. is prepared, while introducing the water into the mixture and agitating it violently up to the inversion of the emulsion. After passing through a coned honogenizer, the emulsion is then added to the principal mixture along with the antifungic derivative, and the preparation is brought to its total volume by the addition of the rest of the water.

This composition has a dry extract of 5.7%. The size must be kept at a temperature of 65° C. during storage and utilization to preserve the emulsion state.

The size kept at 65° C. is applied on the threads during the fiberization of the glass E to obtain, as in Example 1, thread cakes standardized at 34 Tex.

The amount of dry size deposited on the fibers is 1.4% (instead of 0.75% as in Example 1).

Measures taken to observe the migration phenomenon show that the amount of fiber located at the exterior of the cakes and possessing a percentage of dry size greater than 1.6%, represents around 3,000 m no matter what the total length of the cake-forming thread. The rest of the thread has a percentage of dry size of 1.4±0.2% by weight of thread.

From these comparative measures it is seen that the amount of thread containing an excess of dry size as a result of the migration phenomenon is very reduced by using the size according to the invention. Moreover, the percentage of variation of the dry size deposited on the thread is very high for the standard size: 1.4%±0.2%, whereas with the size according to the invention, low migration is evidenced by a very slight percentage variation.

The thread is then subjected to the twisting operation in the standard manner. Practically no dry size deposits or powder is observed during the twisting operation with the size according to Example 1, as opposed to large deposits seen after using the standard size of Example 2. Using the latter size, it is necessary to stop and clean the apparatus frequently. The same is the case during the finish-work operations of threading and weaving.

The twisted thread coated with the size according to the invention has very uniform characteristics along its total length. Besides having good fiber integrity and good protection against abrasion, the twisted thread, wound on a bobbin or "cops" has great winding stability, that is, the windings do not slide, but can still be unwound under low, constant tension, which is not the case for the threads coated with the standard size.

These improved characteristics make for much easier weaving, permitting, with the fibers of Example 1, a maximum speed of 300 m/m, while the thread of Example 2 does not permit speeds above 200 m/m, at which speed the build-up of static electricity on the threads provokes entanglement.

Comparative tests of heat de-sizing show that, after heat treating 200 g of thread at 250° C. for 2 hours, then at 350° C. for 2 hours, the size residue remaining on the thread of Example 2 is 7% by weight of dry size present after de-sizing, while it is zero in the case of the thread coated with the size according to the invention. This size residue is determined by heat loss at 625° C. at constant weight.

EXAMPLE 3

A size is prepared according to the process described in Example 1, but the starch is replaced by a cationic corn starch of low percentage in amylose (27%) obtained by cationization to fix the quaternary ammonium groups. The number of the fixed groups is from 0.04 to 0.045 per anhydro-glucose group. After cooking under the conditions of Example 1, the starch paste has a viscosity of 60 cPo at an 8% concentration and at a temperature of 90° C. The other compositions and percentages used are the same as in Example 1.

The size obtained has a dry extract of 5.5%. It is applied on the threads at a temperature of 35° C.

The amount of dry extract deposited on a thread of 34 Tex is 0.70%±0.05% by weight of thread.

The characteristics of the sized thread are as good as those in Example 1, and in particular the finish textile operations are effected with the same ease, as is the heat de-sizing.

EXAMPLE 4

A size is prepared under the same conditions and in the same percentages as in Example 1, using a potato starch at 26% amylose modified by an oxypropylation treatment. The cooking conditions of the starch are also identical to those of Example 1. The potato starch, after all the starch granules have burst, has a viscosity of 8 cPo at an 8% concentration and at a temperature of 90° C.

The size obtained has a dry extract of 5%. It is applied on the fibers at a temperature of 35° C., as before.

The amount of dry extract deposited on thread of 34 Tex is 0.72% by weight of fiber. The standard textile operations are carried out without any difficulty.

EXAMPLE 5

There is used a potato starch with a low percentage of amylose esterified by a phosphate with 0.02 ester groups per anhydro-glucose group. This starch, cooked under the same conditions as in Example 1, has a viscosity of 30 cPo at an 8% concentration and at 90° C., and the granules are totally burst. This starch is used in the preparation of a size in the same proportions and conditions as in Example 1.

The size obtained has a dry extract of 4.6%. It is applied on the glass fibers at a temperature of 35° C., the amount of dry size deposited on fibers of 34 Tex is 0.80% by weight of thread and the characteristics of the thread are equal to those of the thread in Example 1.

EXAMPLE 6

In the composition of Example 1, the starch is replaced by a hybride corn starch having a high percentage of amylose (50 to 60%) obtained by treatment with an amine, in which one methylol group in 20 has been substituted by a quaternized ammonium. The cooking of this starch is carried out at 95° C. for 25 seconds in a vapor-injection oven, to completely burst all the granules; the viscosity of the obtained paste is 20 cPo at a temperature of 90° C. and at 8% concentration. The other conditions for preparation and the different components stay unchanged. As in the preceding examples, the size has remarkable stability, even at ambient temperatures, permitting its use at a temperature of 35° C. and lower. The dry extract obtained is 4.8%. The amount of dry extract deposited on a thread of 34 Tex is 0.75%. The thread has characteristics as good as in the case of modified starch with a low percentage of amylose.

EXAMPLE 7

The size of Example 1 is reproduced while modifying only the amount of cationic polyethylene emulsion, that is, by introducing into the size composition 5% polyethylene wax emulsion with 25% active material, which corresponds to 1% polyethylene wax. The directly emulsifiable liquid paraffin, and the polyethylene are in the ratio of 1.8/1 (ratio by weight of the active products) while the ratio of the preceding examples is 5–1.

The percentage of dry size deposited on 34 Tex thread is 0.85% by weight of thread. The standard textile operations are satisfactorily effected even though the threads obtained are softer than those of Example 1.

EXAMPLE 8

A size is prepared in the same manner as in Example 1, but the acrylic polymer used is in the form of an emulsion of a non-ionic acrylic copolymer constituted primarily of butyl polyacrylate with a small percentage of polyacrylonitrile, commercially known as "Helizarinbinder F.A." by BASF. The proportion of polymer introduced into the size is 0.36%, the proportions of the other components being identical to those in Example 1.

The size obtained is applied on the filaments at a temperature of 35° C.; the percentage of dry size deposited on 34 Tex thread is 0.69%.

EXAMPLE 9

The copolymer of Example 1 is replaced by 0.80% by weight of "Helizarinbinder TS" which is an emulsion of 45% by weight of a butadiene-acrylonitrile based copolymer. The proportions of the other size components remain unchanged. The percentage of dry size deposited on 34 Tex threads is 0.72%.

The sizes of Examples 8 and 9 yield threads of good integrity. The textile operations are effected without difficulty despite the appearance of some fuzz; size migration and desizing are equivalent to those of Example 1.

EXAMPLE 10

In the size composition of Example 1, in the place of the acrylic copolymer, but in the same proportions, a water soluble polyacrylamide is used. The viscosity of an aqueous solution of polyacrylamide, at a pH and dry extract equal to 33%, is 450 cPo at 20° C.

During fiberization, the temperature of the size is maintained at 35° C.; the quantity of dry size deposited on 34 Tex thread is 0.67% by weight of thread.

The thread has all of the improved characteristics presented in the comparative study with the standard size of Example 2.

EXAMPLE 11

In the composition of Example 1, the acrylic copolymer is replaced by 0.2% by weight of a copolymer of butyl acrylate, styrene and acrylic acid in the respective proportions of 60%, 36%, and 4%, brought to a pH of 5 by means of ammonia.

The size is prepared as before, then applied to the filaments at a temperature of 35° C.

The thread of 34 Tex has a dry size percentage of 0.75% by weight and has good integrity, very superior to that obtained with the standard size of Example 2, with no powder or other deposits left during the course of textile operations.

We claim:

1. Aqueous size for glass fibers, characterized in that it is comprised essentially of from 0.5 to 10% by weight of modified starch in which almost the entire mass of starch granules is burst, 0.1 to 5% by weight of an acrylic polymer, 1 to 5% by weight of a non-ionic lubricant containing an emulsifier, 0.2 to 2% by weight of a polyethylene wax, and 0.03 to 0.6% by weight of a cationic emulsifier of the said polyethylene wax.

2. Size according to claim 1, characterized in that from 90% to 100% of the granules of modified starch are burst.

3. Size according to claim 1, characterized in that the starch in the form of a paste has, after cooking at a temperature of not more than about 100° C., and after total bursting of its granules, a viscosity between 15 and 200 cPo at 6% concentration and a temperature of 20° C.

4. Size according to claim 1, characterized in that the starch is modified by an etherification treatment with an alkylene oxide in a way to form between 0.01 and 0.30 ether groups per anhydroglucose group of the starch.

5. Size according to claim 1, characterized in that the starch is modified by an esterification treatment with a member of the group consisting of acid anhydrides and phosphates to form between 0.01 and 0.30 ester groups per anhydro-glucose group of the starch.

6. Size according to claim 1, characterized in that the starch is modified by a cationization treatment to obtain between 0.01 and 0.30 nitrogenous groups per anhydroglucose group of the starch.

7. Size according to claim 1, characterized in that the starch is modified by a liquefying hydrolysis by means of a strong acid.

8. Size according to claim 1, characterized in that the non-ionic lubricant is a mineral oil containing 15 to 30% of its weight of an emulsifying agent.

9. Size according to claim 8, characterized in that the mineral oil is a liquid vaseline having a viscosity of about 3° Engler at 20° C.

10. Size according to claim 1, characterized in that the polyethylene wax has a fusion point between 100° and 130° C.

11. Size according to claim 10, characterized in that the polyethylene wax is emulsified in water by means of a long carbon chain aliphatic quaternary amine present at from 15 to 30% by weight with respect to the said polyethylene wax.

12. Size according to claim 1, characterized in that the acrylic polymer is a copolymer formed from at least one anionic monomer selected from group A constituted by acrylic, methacrylic, fumaric and itaconic acids of from 1 to 15 parts by weight for 100 parts of copolymer and from at least one non-ionic monomer selected from group B constituted by acrylamide, acrylonitrile, acrylates and alkyl methacrylates of from 30 to 95 parts by weight of each monomer.

13. Size according to claim 1, characterized in that the acrylic polymer is a non-ionic copolymer formed from monomers selected from group B constituted by acrylamide, acrylonitrile, acrylates and alkyl methacrylates of which the alkyl radical comprises up to eight carbon atoms.

14. Size according to claim 1, characterized in that the acrylic polymer is a homopolymer formed from one of the monomers of the group B constituted by acrylamide, acrylonitrile, acrylates and alkyl methacrylates in which the alkyl radical comprises up to 8 carbon atoms.

15. Size according to claim 1, characterized in that non-acrylic monomers selected from the class consisting of butadiene, styrene, vinyl acetate, and vinyl chloride are added to the acrylic monomer in a quantity at most equal to 70 parts by weight.

16. Size according to claim 1, characterized in that N-methylol-acrylamide is added to the acrylic monomer in a quantity at most equal to 70 parts by weight.

17. Aqueous size for glass fibers according to claim 1, characterized in that it contains 3 to 5% by weight of modified starch, 0.3 to 1.5% by weight of an anionic acrylic copolymer that is soluble in water, 1.5 to 2.5% by weight of a mineral oil rendered emulsifiable by a non-ionic emulsifying agent, 0.3 to 1% by weight of a polyethylene wax of which the melting point is between 100° and 130° C., 0.07 to 0.25% by weight of a cationic emulsifier of the said polyethylene wax, the rest of the mix being water.

18. Sized glass fibers, characterized in that they comprise a proportion of dry size comprised between 0.4 and 1.2% with respect to the weight of the fibers and preferably between 0.60 to 0.80%, this dry size being obtained by depositing the following aqueous composition:

0.5 to 10% by weight of modified starch in which almost the entire mass is burst
0.1 to 5% by weight of an acrylic polymer
1 to 5% by weight of a non-ionic lubricant containing an emulsifier
0.2 to 2% by weight of a polyethylene wax
0.03 to 0.6% by weight of a cationic emulsifier of the said polyethylene wax.

19. Size according to claim 1 characterized in that the starch is modified by either an etherification treatment, an esterification treatment, a cationization treatment or a liquefying hydrolysis and has a viscosity between 15 and 200 cPo at 6% concentration and a temperature of 20° C.

20. Sized glass fibers according to claim 18 characterized in that from 90% to 100% of the granules of starch are burst.

21. Sized glass fibers according to claim 18 characterized in that the starch in the form of a paste has, after cooking at a temperature of not more than about 100° C., and after total bursting of its granules, a viscosity between 15 and 200 cPo at 6% concentration and a temperature of 20° C.

* * * * *